April 12, 1949.  T. R. SMITH  2,467,099
SHAFT AND BEARING SEAL
Filed April 27, 1946
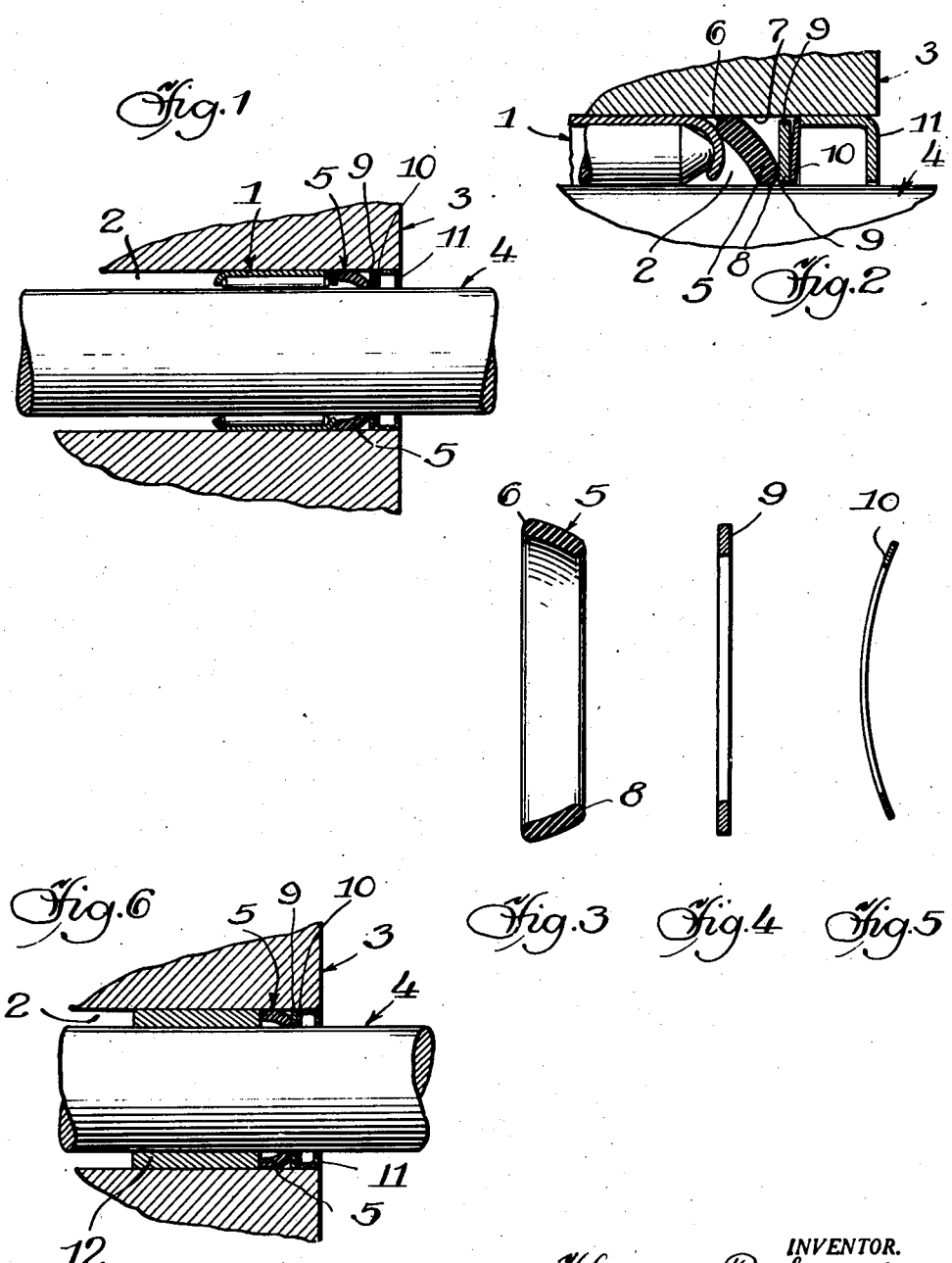
INVENTOR.
Thomas R. Smith,
BY
Parkinson Lowe
Attys.

Patented Apr. 12, 1949

2,467,099

UNITED STATES PATENT OFFICE 2,467,099

SHAFT AND BEARING SEAL

Thomas R. Smith, Newton, Iowa, assignor to The Maytag Company, Newton, Iowa, a corporation of Iowa Application April 27, 1946, Serial No. 665,497

8 Claims. (Cl. 308—187.1)

The present invention relates to a novel seal assembly for a needle or sleeve bearing and especially to a novel seal for the shaft passing through such bearing without the necessity of machining an additional counterbore.

In the construction of a gear box or similar arrangement, it is frequently necessary to employ an inserted sleeve or needle bearing. When this is done, it is often desirable to seal up the shaft passing through the bearing without machining an additional counterbore into which may be inserted a commercial form of seal. Without such additional counterbore, the only space available for sealing purposes is the small annular space between the shaft and the outer end of the needle or bearing sleeve that has been inserted in the space between the shaft and the encompassing housing or casing.

It is, therefore, an object of the present invention to provide a novel shaft and bearing seal that will effectively seal the small, annular space provided or available between the shaft and the housing bore diameter and having a press fit on the needle or sleeve bearing.

Another object of the present invention is the provision of a novel sealing element adapted to seal the bearing in such manner as to prevent any leakage around the press fit of the bearing as well as prevent any possible leakage about the shaft.

Another important feature of the present invention is to provide a sealing element maintained in sealing position by means of longitudinal or axial pressure and also maintained in sealing contact with the shaft and the encompassing surface in the bore in the housing.

A further object of the present invention is to provide a novel sealing means associated with a sleeve or needle bearing for sealing the annular space available adjacent the end of the bearing, and eliminating any additional counterbore.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Fig. 1 is a view in vertical cross-section through one embodiment of the novel shaft and bearing seal associated with a needle bearing.

Fig. 2 is an enlarged fragmentary view in vertical cross-section of the assembly of Fig. 1, but showing the sealing element disposed at another inclination or angle.

Fig. 3 is a view in vertical cross-section of the annular sealing element as molded or formed and before it is assembled.

Fig. 4 is a view in vertical cross-section of a flat annular washer seating against the sealing element.

Fig. 5 is a view in vertical cross-section through an annular spring washer for tensionally retaining the sealing element in sealing contact with the end of the bearing, housing and shaft, the washer being formed in the dished manner to apply pressure against the sealing element.

Fig. 6 is a view similar to Fig. 1, but showing the substitution of a sleeve bearing for the needle bearing.

Referring to the drawing and especially to the novel illustrative embodiment shown in Figs. 1 and 2, there is shown therein a needle bearing 1 mounted by a press fit into an opening or bore 2 in a housing or casing 3. This needle bearing is adapted to receive and carry a shaft 4 passing therethrough. As clearly shown in these figures, the bearing 1 is pushed into the housing or casing sufficiently to leave an annular opening or space in the bore between the housing or casing 3 and the shaft 4 in which is mounted the novel construction and arrangement of sealing means.

This sealing means comprises a flexible seal or sealing element 5 preferably formed or molded of a resilient or flexible material including natural or compounded synthetic rubber. It is molded in such manner as to provide an outer diameter slightly larger than the opening or counterbore in the housing, and an inner diameter slightly less than the diameter of the shaft 4, whereby when this sealing element is inserted into the annular opening, its outer rounded sealing edge 6 will contact and seal against the interior 7 of the housing 3 and the bearing 1 and its inner rounded sealing edge 8 will seat and seal against the shaft 4.

In order to maintain the rounded outer and inner sealing edges 6 and 8 in continuous sealing contact with the housing, bearing and shaft, respectively, the invention comprehends the provision of a flat washer 9 fitting loosely over the shaft and within the opening or counterbore and seating or abutting against the sealing element, and held under compression by a spring washer 10, the latter being held in place by means of a retainer 11 press fitted into the outer end of the annular opening or space between the shaft and housing and forwardly of the bearing.

It will be appreciated that as the seal or sealing element is continuously maintained under compression by the spring washer, any wear on the sealing edges 6 and 8 will be compensated for. Furthermore, the spring washer places a pressure on the sealing element in the direction of the axis of the shaft being sealed, and this pressure in combination with the shape of the sealing element tends to place a slight bulge in the latter, thus giving a certain amount of stored up resilience or flexibility which is augmented by the spring washer 10, so that any reduction of pressure due to permanent set and wear can be compensated for.

The novel sealing element prevents any leakage about the press fit of the bearing and also about the shaft. It completely seals the annular opening about the shaft independently of the press fit seal of the needle bearing and also independently of the press fit seal of the retainer 11.

In Fig. 6, the invention is shown as applied to a sleeve bearing 12, the sealing element and associated structure being similar to that shown in Figs. 1 to 5, inclusive, and similar reference characters have been applied thereto.

The novel sealing element 5 is preferably conical and slightly bulged or curved in order to determine the direction of bulge that the sealing element will take, although the conical or inclined surface of this member may be substantially flat or it may be bulged in either direction. In the disclosed embodiment, this conical surface bulges slightly outward whereby the flat washer 9 seats against the convex side thereof.

From the above description and the disclosure in the drawing, it will be appreciated that the invention comprehends a novel sealing element and assembly adapted to effectively seal the space in a relatively small annular opening encompassing a shaft.

Having thus disclosed my invention, I claim:

1. In combination with a housing having a bore therein, a shaft extending through the bore and providing a restricted annular space therebetween, a bearing disposed in the annular space to journal and position the shaft in the housing, and sealing means mounted in said annular space adjacent the bearing and comprising a resilient sealing element of substantially conical shape provided with an outer sealing edge engaging an end of the bearing and the surrounding housing and an inner sealing edge spaced axially of the outer edge and engaging the shaft, said sealing element being so contoured as to apply sealing pressure radially whereby to effectively seal about the bearing and prevent any leakage about the shaft, and means for maintaining the sealing element under axial pressure.

2. In combination with a housing having a bore therein, a shaft extending through the bore and providing a restricted annular space therebetween, a bearing disposed in the annular space to journal and position the shaft in the housing, a resilient sealing element mounted in the annular space and of substantially conical shape with its large diameter end adapted to seat against the end of the bearing and seal against the adjacent surface in the housing and its smaller diameter end adapted to seat upon and seal against the shaft whereby its ends apply radial sealing pressure against the housing and shaft, and means for maintaining the sealing element under axial pressure whereby the sealing ends are retained in continuous sealing contact.

3. In combination with a housing having a bore therein, a shaft extending through the bore and providing a restricted annular space therebetween, a bearing disposed in the annular space to journal and position the shaft in the housing, a resilient sealing element mounted in the annular space and provided with an outer rounded sealing edge seating against the bearing and the adjacent surface on the housing and an inner rounded sealing edge seating upon the shaft, said sealing element being so contoured as to maintain the sealing engagement under operating conditions, and means for retaining the sealing element in assembled relation.

4. In combination with a case having a bore therein, a shaft extending through the bore and providing a restricted annular space therebetween, a bearing disposed in the annular space to journal and position the shaft in the case, a resilient sealing element mounted in the annular space adjacent the bearing and provided with an outer rounded sealing lip having continuous sealing engagement with the bearing and case and an inner rounded sealing lip having continuous sealing engagement with the shaft, and means for maintaining the sealing element under compression.

5. In combination with a case having a bore therein, a shaft extending through the bore and providing a restricted annular space therebetween, a bearing disposed in the annular space to journal and position the shaft in the case, a substantially conical shaped sealing element in the annular space provided with a slight bulge and formed of a molded, resilient material having an outer sealing edge pressed against the bearing and seating against the case, and an inner sealing edge seating upon the shaft, and means augmenting the compression on the sealing element to compensate for any reduction in pressure due to permanent set and wear.

6. In combination with a case having a bore therein, a shaft extending through the bore and providing a restricted annular space therebetween, a bearing disposed in the annular space to journal and position the shaft in the case, a substantially conical shaped sealing element mounted adjacent the bearing in the annular space and formed of a molded, resilient material having an outer sealing edge pressed against the bearing and seating against the case, and an inner sealing edge seating upon the shaft and disposed axially of the outer sealing edge, a spring washer applying pressure to the sealing element and a retainer for maintaining the assembly in the annular space.

7. In combination with a housing having a bore therein, a shaft extending through the bore and providing an annular space therebetween, a bearing member disposed in the annular space remote from one end thereof to journal and position the shaft in the housing, and sealing means mounted in the annular space and comprising a substantially crescent-shaped conical resilient member having its inner and outer edges rounded with its outer edge projecting forwardly to engage the bore in the housing and the adjacent end of the bearing member, and the inner edge projecting away from the bearing member and contacting the shaft remote therefrom, and spring means acting on the portion of the sealing member remote from the bearing to maintain a predetermined pressure thereon.

8. In combination, a housing having a bore therein, a shaft extending into the bore and providing an annular space between the shaft and bore, a bearing member disposed in the annular space remote from one end thereof to journal and position the shaft in the housing, a substantially crescent-shaped conical resilient and impervious sealing member having rounded end portions disposed in the annular space in such manner that the one end portion of the seal contacts the shaft and the other end portion contacts the encompassing housing, a washer disposed adjacent the portion of the seal remote from the bearing member, a retainer disposed in the annular space about the shaft and adjacent the end of the bore, and a spring device disposed between the retainer and washer to compress the conical resilient member and thereby maintain it in compression.

THOMAS R. SMITH.

REFERENCES CITED

The following references are of record in the file of this patent:

UNITED STATES PATENTS

| Number | Name | Date |
| --- | --- | --- |
| 472,288 | Edison | Apr. 5, 1892 |
| 549,750 | Spornhauer | Nov. 12, 1895 |
| 762,081 | McNulty | June 7, 1904 |
| 1,057,656 | Miller | Apr. 1, 1913 |
| 1,621,272 | Raymond | Mar. 15, 1927 |
| 1,803,062 | Hornhorst | Apr. 28, 1931 |
| 1,963,704 | Johnson | June 19, 1934 |
| 1,971,422 | Marsh | Aug. 28, 1934 |
| 2,274,137 | Frauenthal | Feb. 24, 1942 |